United States Patent [19]
Huzenlaub et al.

[11] Patent Number: 5,920,835
[45] Date of Patent: Jul. 6, 1999

[54] METHOD AND APPARATUS FOR PROCESSING AND TRANSMITTING TEXT DOCUMENTS GENERATED FROM SPEECH

[75] Inventors: Richard Huzenlaub, Höfen; Dieter Kopp, Hemmingen, both of Germany

[73] Assignee: Alcatel N.V., Rijswijk, Netherlands

[21] Appl. No.: 08/869,476

[22] Filed: Jun. 5, 1997

Related U.S. Application Data

[63] Continuation of application No. 08/305,849, Sep. 14, 1994, abandoned.

[30] Foreign Application Priority Data

Sep. 17, 1993 [DE] Germany .............................. 43 31 710

[51] Int. Cl.⁶ ....................................................... G10L 5/06
[52] U.S. Cl. ........................................... 704/235; 704/260
[58] Field of Search ..................................... 704/235, 231, 704/251, 260, 270, 278; 395/200.3; 358/442; 379/52, 100.13

[56] References Cited

U.S. PATENT DOCUMENTS

| | | | |
|---|---|---|---|
| 5,051,924 | 9/1991 | Bergeron et al. | 395/2 |
| 5,333,266 | 7/1994 | Boaz et al. | 395/200.01 |
| 5,479,411 | 12/1995 | Klein | 358/402 |

FOREIGN PATENT DOCUMENTS

| | | | |
|---|---|---|---|
| 3328085 | 2/1985 | Germany | G10L 5/00 |
| 3615661 | 11/1987 | Germany | G10L 3/00 |
| 3910467 | 10/1989 | Germany | G10L 7/08 |
| 4101200 | 7/1992 | Germany | H04M 3/50 |
| 58-168059 | 11/1983 | Japan | G06F 3/16 |
| 64-74845 | of 1989 | Japan | H04L 11/20 |
| 0637946 | 2/1994 | Japan | H04N 1/00 |
| 1716498 | 2/1992 | U.S.S.R. | G06F 3/00 |
| 9001843 | 2/1990 | WIPO | H04M 11/10 |
| 9009716 | 8/1990 | WIPO | H04N 1/04 |

OTHER PUBLICATIONS

N,N,: Personalized Voice–to–Text. In. Research Disclosure, May 1993/351, S. 34990.

Derwent: TP—39105; Voice activated license identification service, Datenbank Abstract aus World. Patent Index—Online.

TP—99105: Network order entry service for telecommunications system, Datenbank Abstract aus World Patents Index—online.

*Primary Examiner*—Kee M. Tung
*Attorney, Agent, or Firm*—Ware, Fressola, Van Der Sluys & Adolphson LLP

[57] ABSTRACT

Generating, sending, receiving and commenting a text document via a telecommunication installation. A text document is generated by means of speech and converted into text data by a speech recognizer (SEK). The text data can be corrected, edited and commented by means of speech. Transmission is automatic via the telecommunication installation (VA).

4 Claims, 4 Drawing Sheets

METHOD AND APPARATUS FOR PROCESSING AND TRANSMITTING TEXT DOCUMENTS GENERATED FROM SPEECH

This application is a continuation of application(s) Ser. No. 08/305,849 filed on Sep. 14, 1994, now abandoned.

TECHNICAL FIELD

The invention concerns a method and a device for dictating, transmitting, receiving and adding comments to a text document by means of a telecommunication installation.

BACKGROUND OF THE INVENTION

Until now a "Method and Device for Generating Reports" was known from German patent application DE 39 10 467 A1. It describes that speech signals, including predetermined trigger expressions, are transmitted e.g. by a multiple line telephone to a speech recognition system. The speech recognition system assigns the trigger expressions to predetermined blocks of text messages and generates a report. The text is then released to a speech synthesizer wherein synthetic speech signals are generated, which are read out to a speech memory and relay system for later recovery. The system also produces a printed copy of the text in the report.

In addition, a "Communication System" is known from the German patent application P 41 01 200.3 with the same title, which converts speech dictated to a transmitting and receiving device into synthetic speech and/or into text. The speech and/or text is then relayed to a central receiver. Particularly ISDN/telefax, ISDN/telex and letter mail are mentioned for the relaying.

SUMMARY OF THE INVENTION

The invention has the task of creating a method and a device whereby a text document can be dictated, transmitted, received and comments added to via a telecommunication installation.

The task is fulfilled by a method of dictating and transmitting a text document by means of a telecommunication device wherein a text is dictated in the form of speech, wherein the speech is converted by means of a speech recognizer into text data, wherein the text data can be corrected by means of speech, wherein editing can be done in the form of the text data, and wherein the text is transmitted as text data to subscribers through a telecommunication network. It is also fulfilled by a method of receiving, and adding a comment to, a multimedia document by means of a telecommunication device wherein text data of the multimedia document can be viewed, and wherein text data of the multimedia document can be printed out, and wherein text data can be converted into speech, and wherein a comment can be added to the text document, which can then be sent on. The invention is also directed to an apparatus for dictating and transmitting a text document by means of a telecommunication device, comprising dictating means, means for transmitting spoken words to a speech recognizer, the speech recognizer for converting speech into text data, software for correcting text data by means of speech, software for editing in the form of text data, and means for transmitting the text data to another subscriber.

An advantage of the invention is that a cost-effective device is provided whereby a text document can be forwarded. With the same cost-effective device the text document can be corrected, edited and also receive comments from another subscriber.

It is a further advantage that the above mentioned functions are not limited to a text document, but can be applied to a multimedia document.

The device of the invention permits a subscriber in an advantageous manner to e.g. dictate a facsimile for another subscriber, which is then automatically relayed without the intermediacy of a secretary. In this way a subscriber is in a position to dictate and transmit a facsimile independently of a typewriter or a word processing program in a PC.

Other aspects of the invention include a personal address list and/or a personal distribution list that is made available by speaking a short word, so that the transmission to a subscriber or to a distribution list can take place in simple form.

A dictated text can also be read out to the subscriber. This can take place at any time, particularly at the end of the dictation, allowing possible improvements or corrections to be made.

The subscriber furthermore has a personal vocabulary, which increases the speech recognition rate, among others.

Comments to the received text documents are also easy to make.

Further, the invention is directed to editing of multimedia documents in simple form.

Further configurations of the device provide means whereby a text document can be reconverted into speech, which advantageously allows a text to be read out at any time.

Also, means for subscriber identification are provided, for example to prevent access by an unauthorized subscriber, and to make a personal address and distribution list available, which offers a simplified possibility to send out the text documents or multimedia documents.

BRIEF DESCRIPTION OF THE DRAWINGS

In the following, the invention will be explained in more detail by means of the figures.

BEST MODE FOR CARRYING OUT THE INVENTION

Figure 1:
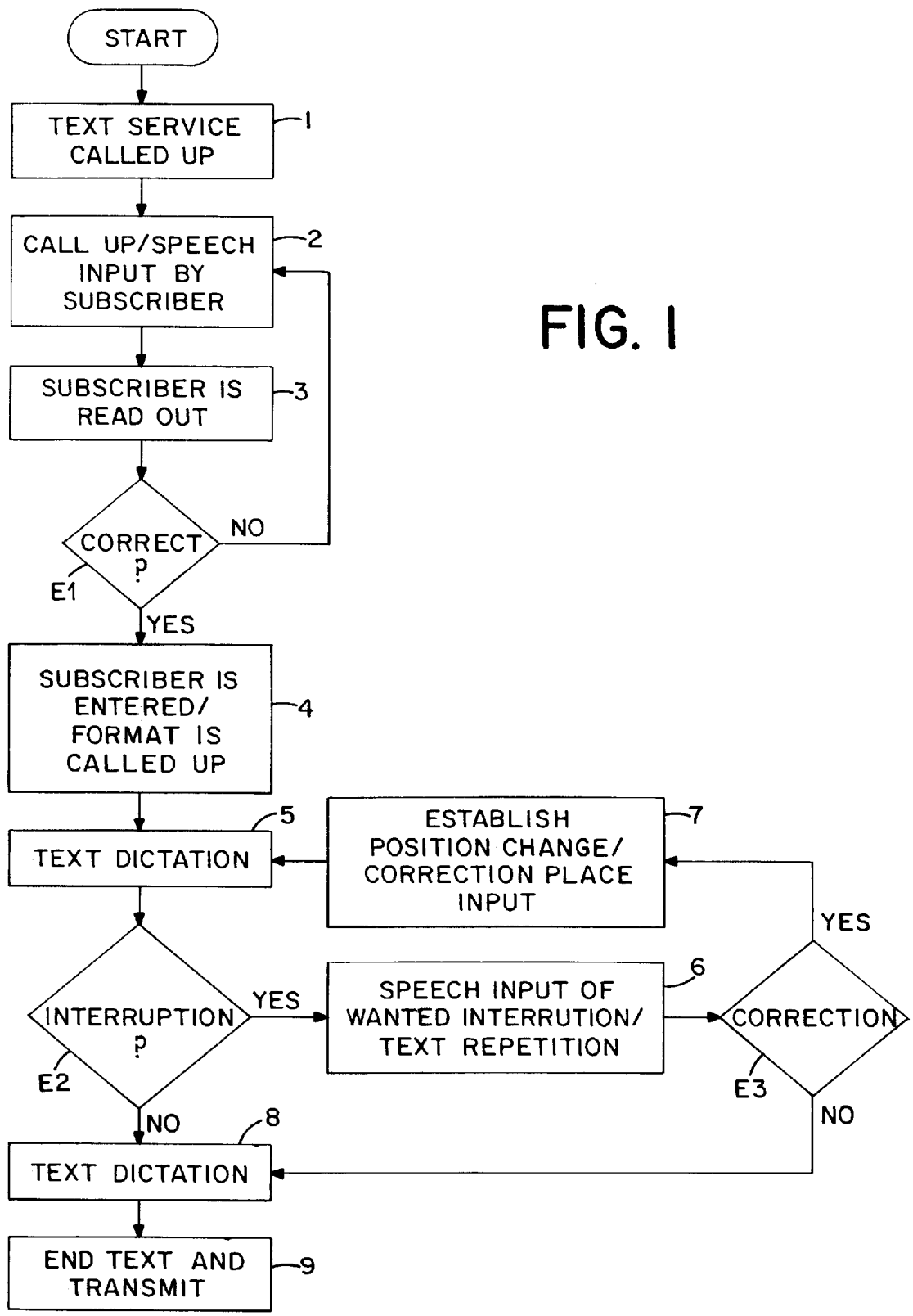
FIG. 1 is a flow diagram of the method of the invention according to a principal embodiment.

Configuration examples are explained in greater detail in the following, where the method according to claim 1 is explained by means of FIG. 1.

A subscriber wants to send e.g. a facsimile to another subscriber. The following method is provided to be in a position to dictate and send text in the form of speech from any location, which only needs to have a telephone, for example.

In a first step 1, a text service is called up. As explained in more detail further on, this requires activating a speech recognizer.

The call to a subscriber or the spoken input of a subscriber takes place in a second step 2. In this instance, either the subscriber and the pertinent address can be fully input in the form of speech, or the subscriber's address is stored in an address directory, so that the full address can be activated and entered by simply speaking the name. It is furthermore possible to establish a distribution, e.g. by speaking a short word as the key word. The distribution is contained in a distribution list and indicates when and to whom the text document is to be sent. In this way a distribution determines a large number of subscribers to whom the same text document, e.g. a facsimile, must be sent.

In a third step 3, so-called text-to-speech-function software converts the text data into speech. This function speaks or reads out the subscriber or the distribution, to guarantee the accuracy of the entered address or the distribution. This can be increased, e.g. by verbally confirming the spoken address or the distribution.

The confirmation and speaking of the address or the distribution is not absolutely necessary, and can also be spoken again before the sending, where the command to send is an indirect confirmation.

The decision that the subscriber is the wrong one, made during a first decision step E1, requires a new call or the subscriber to speak again. If the decision is made that the subscriber is the correct one, the subscriber is entered in a fourth step 4. The fourth step 4 also calls up a format. The format determines e.g. that a facsimile format must be arranged and completed.

In a fifth step 5, text is dictated in the form of speech. The possibility of interrupting exists at any time during the dictation, as indicated by the second decision step E2. In the event an interruption is wanted, there is the possibility to express this verbally in another step 6, and to cause the text to be repeated. There are also the possibilities of repeating a word, a sentence, a paragraph or the entire text.

If a correction E3 is wanted, the changed position is established in the next step 7, and the desired correction is dictated. This causes continuation of the dictation of running text 5. If a correction E3 is wanted, or there is no desire to interrupt, the dictation of a text continues in a subsequent step 8.

The text ends in a final step 9, it is then possibly read out again and transmitted upon agreement.

The above described order of events can be depicted as follows by means of an example in the form of a course protocol:

| Speech input | | Function/effect | | Speech output |
|---|---|---|---|---|
| "FAX" | --> | Stored fax-head is called Actual data are entered. | | --> "To whom?" |
| | <--- | | | |
| "Mr. Müller" | --> | Mr. Müller's name is converted and entered. Alternatives: I. A private address register can be consulted whether Mr. Müller's address and FAX number already exist. | | --> "Please confirm" if Mr. Müller's address is so-and-so" |
| | <--- | | | |
| "Yes" | --> | II. Mr. Müller's address and FAX number are requested. --> | | "Address?" |
| | <--- | | | |
| so-and-so Street ... --> | | I. After confirmation, the address is entered. If the confirmation is negative: → case II. --> II. The address is converted and entered. | | --> "Concerning" |
| | <--- | | | |
| "Order" | --> | Conversion and input. | | --> "Please enter FAX text." |
| | <--- | | | |
| "Hereby" | --> | Conversion and input. | | --> "End?" |
| | <--- | | | |
| "Yes" | --> | Automatic input: Best regards. The full text is reread through the text-to-speech function. | | --> "Hereby ... " "Do you want to make any corrections?" |
| | <--- | | | |
| "No" | --> | End FAX text. | | --> "Should the FAX be transmitted?" |
| | <--- | | | |
| "Yes" | --> | The FAX is transmitted. | | |

There are several variation possibilities for the above described course protocol.

Figure 2:
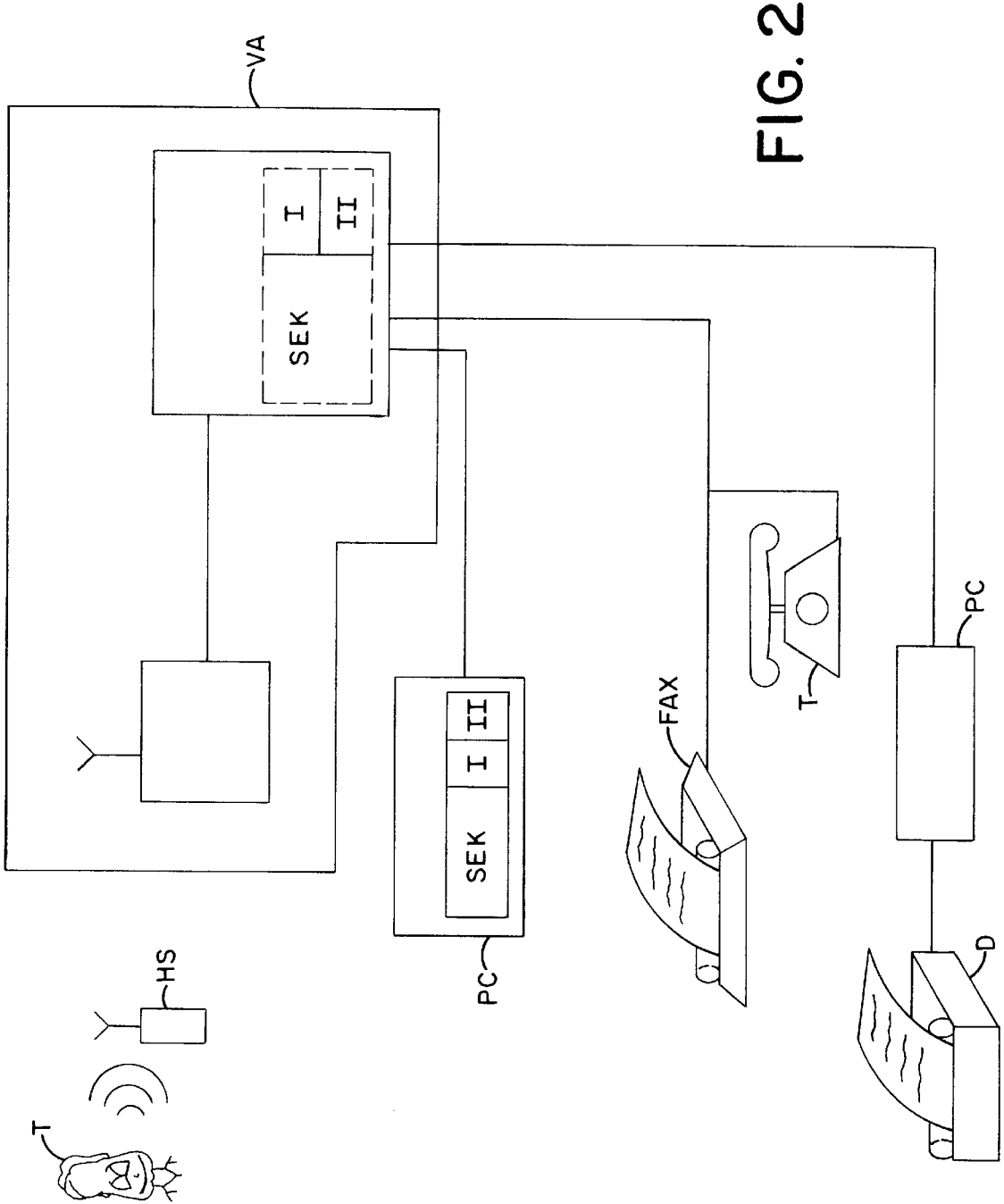
FIG. 2 is a block circuit diagram of the device according to the invention.

The following explains the device by means of FIG. 2.

A device for dictating and transmitting a text document by means of a telecommunication installation consists of a speech input device HS, through which a subscriber T can dictate text in the form of speech. For example, the speech input device HS can be a cordless telephone, a mobile telephone, etc.

To dictate text in the form of speech, thus to set up a text service, a speech recognizer SEK is provided to convert speech into text. The speech recognizer SEK can e.g. be located in a switching installation VA, where it is activated by the emission of a subscriber identification.

As an alternative, the switching installation VA can establish a connection to a personal, private data processing PC, in which the speech recognizer SEK is located. The individual process steps are performed as described earlier.

In addition to the speech recognizer SEK, there is software for the correction I of text data in the speech recognizer. The corrections can be input by means of speech.

Software for editing II text data is also located in the speech recognizer SEK.

The device of the invention also contains an installation for transmitting text data to another subscriber. This can also take place through switching installation VA, for example.

The device furthermore contains a FAX installation for printing the received document and/or means T for voicing speech.

If for example a text document is transmitted, and the other subscriber has no facsimile connection, and if there also is an access to the speech recognizer SEK, the text-to-speech function can reform the speech, which is then output via the telephone.

The device also consists of a personal computer PC with an attached printer D. The document can be viewed on the computer and printed with comments, if desired.

Figure 3:
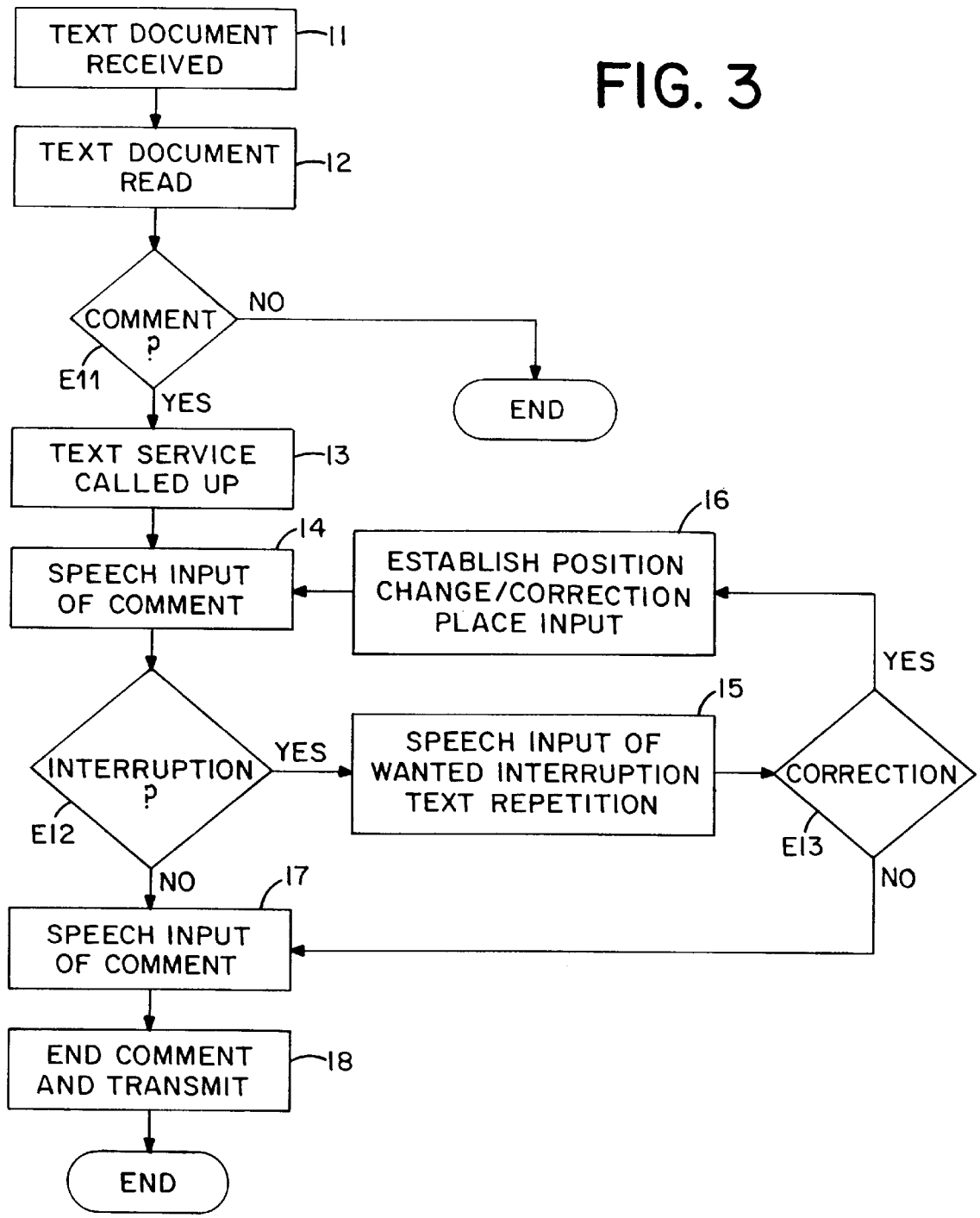
FIG. 3 is a flow diagram of an advantageous configuration of the method.

The following explains in more detail a configuration example for receiving and commenting a text document by means of FIG. 3.

A text document is received in a first step 11. It can arrive as a facsimile, for example, or as so-called E-mail in a personal computer.

The text document is read in the next step 12. A decision step Ell determines whether or not a comment should be added. If no comment is added, the process is completed ENDE. If a comment is added, the text service is called up in the next step 13. A spoken comment is added in another step 14.

To provide the possibility of an interruption or an improvement in this case as well, if such an interruption is wanted, the desire to interrupt is expressed during a decision step E12 in the next step 15, and the text is repeated by means of the above explained methods.

If a correction E13 is wanted, a position change is determined in step 16 and the correction place is entered. This again is followed by step 14.

If no correction E13 is wanted, the following step 17 continues the process with a further spoken comment.

The comment is completed and transmitted in the final step 18. In this instance e.g. the entire text plus comment, or only the comment, can be transmitted to one or several subscribers.

If a text service is called up during the above described methods, a subscriber identification is supplied to permit access to the text service. This can take place for example by speaking a code word, or by means of any other known method.

After the subscriber has been identified, a personal vocabulary e.g. can be made available to the subscriber. Furthermore, an identified text service subscriber can be assigned a personal address list and/or a distribution list.

Figure 4:
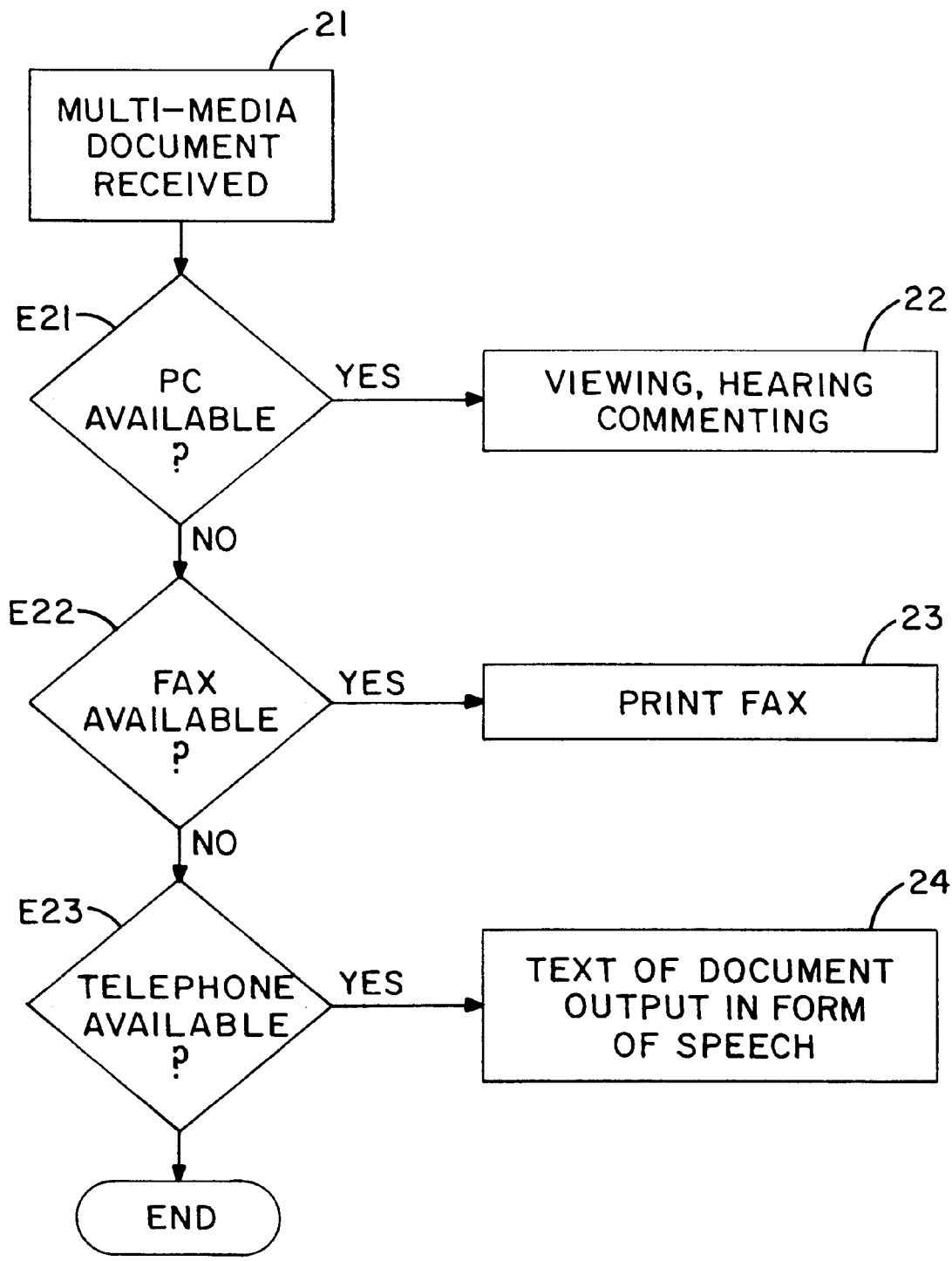
FIG. 4 is a flow diagram of the method of the invention according to a second principal embodiment.

The following explains an embodiment of the method by means of FIG. 4.

A method for receiving and commenting a multimedia document by means of a telecommunication installation consists of a first step 21, the reception of a multimedia document.

In the event a personal computer PC is available E21, the multimedia document can be viewed, read, heard and commented verbally as well as by text input 22.

If no PC is available but a facsimile FAX is available E22, the text data is printed as FAX 23.

If no facsimile is available, but a telephone is available E23, the speech text of the multimedia document is voiced and output 24. The text data can also be converted into speech and voiced by the above explained text-to-speech function.

As with text documents, multimedia documents can also be edited and transmitted to a subscriber.

What is claimed is:

1. A method, comprising the steps of:
    dictating a text in the form of speech via a telephone apparatus;
    transmitting said speech via a first telecommunication network to said data transmitting device;
    converting said speech into said text data via a speech recognizer at said data transmitting device;
    dictating said text data in the form of further speech at said data transmitting device;
    transmitting said further speech via the first telecommunication network to said telephone apparatus;
    expressing verbally via said telephone apparatus that an interruption of the step of dictating said text data at said data transmitting device is wanted for editing or for repeating already dictated text;
    establishing verbally via said telephone apparatus an editing position where a text edit is desired;
    dictating the text edit in the form of yet further speech via said telephone apparatus;
    transmitting said yet further speech via a first telecommunication network to said data transmitting device;
    editing the text data at the editing position in response to the yet further speech, for providing edited text data; and
    transmitting said edited text data via a second telecommunication network to said data receiving apparatus.

2. The method as claimed in claim 1, wherein said telephone apparatus is a mobile telephone apparatus, and wherein said first telecommunication network is a mobile telecommunication network.

3. An apparatus, comprising:
    means for receiving a text in the form of speech via a first telecommunication network, said speech issuing from a telephone apparatus;
    a speech recognizer for converting said speech into text data;
    a speech generator for dictating said text data in the form of further speech;
    means for transmitting said further speech via the first telecommunication network to said telephone apparatus;
    means for establishing an editing position in said text data and for editing said text data both in response to yet further speech received via the first telecommunication network and issuing from said telephone apparatus, so as to provide edited text data; and
    a data transmitting device for transmitting said edited text data via a second telecommunication network to a data receiving device.

4. An apparatus according to claim 3, wherein said telephone apparatus is a mobile telephone apparatus, and wherein said first telecommunication network is a mobile telecommunication network.

* * * * *